United States Patent
Tanji et al.

(10) Patent No.: US 6,774,817 B2
(45) Date of Patent: Aug. 10, 2004

(54) REFLECTION MULTIPLIER RADIO WAVE MARKER SYSTEM AND TRAFFIC SYSTEM

(75) Inventors: Yoshihiko Tanji, Osaka (JP); Satoru Handa, Nara (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 4 days.

(21) Appl. No.: 10/156,966

(22) Filed: May 29, 2002

(65) Prior Publication Data

US 2002/0193919 A1 Dec. 19, 2002

(30) Foreign Application Priority Data

May 30, 2001 (JP) ........................................ 2001-161965

(51) Int. Cl.⁷ .................................................. G08G 1/01
(52) U.S. Cl. ........................ 340/933; 340/905; 340/901; 701/23
(58) Field of Search .................................. 340/933, 905, 340/939, 435, 436, 901, 825.36, 825.49; 901/23, 117

(56) References Cited

U.S. PATENT DOCUMENTS

| | | | |
|---|---|---|---|
| 3,813,497 A | * | 5/1974 | Wachs et al. ............ 179/18 GF |
| 5,451,941 A | * | 9/1995 | Lamazou .................... 340/933 |
| 5,889,478 A | * | 3/1999 | Minesi ....................... 340/933 |
| 6,097,312 A | * | 8/2000 | Tanji .......................... 340/905 |
| 6,173,005 B1 | * | 1/2001 | Kotzin ....................... 375/141 |

FOREIGN PATENT DOCUMENTS

| | | |
|---|---|---|
| EP | 1103938 | 5/2001 |
| WO | WO 00/72288 | 11/2000 |

OTHER PUBLICATIONS

European Search Report for EP 02 01 1937, dated Aug. 26, 2002.

* cited by examiner

*Primary Examiner*—Anh V. La
(74) *Attorney, Agent, or Firm*—RatnerPrestia (57) ABSTRACT

A reflection multiplier radio wave marker system which comprises a plurality of transmit antennas mounted on board a vehicle for transmitting electric wave signals in a first frequency; a reflection multiplier radio wave marker installed in the surface of a road, which reflects and transmits the electric wave signal of first frequency after multiplying it into an electric wave signal of a second frequency; and a receive antenna mounted on board the vehicle for receiving the electric wave of second frequency. The system specifies the location of a vehicle in a traffic lane by making use of the second frequency electric wave signal reached from a marker. It can detect a marker throughout substantially the entire width range of a vehicle. A traffic system using the marker system is also disclosed. The function of specifying the location of a radio wave marker is performed throughout the entire vehicle width.

22 Claims, 6 Drawing Sheets

REFLECTION MULTIPLIER RADIO WAVE MARKER SYSTEM AND TRAFFIC SYSTEM

FIELD OF THE INVENTION

The present invention relates to a reflection multiplier radio wave marker system which employs a radio wave lane marker installed in the surface of a road for providing a vehicle with information about location in the width direction in a traffic lane and road status, and to a traffic system.

BACKGROUND OF THE INVENTION

Figure 6:
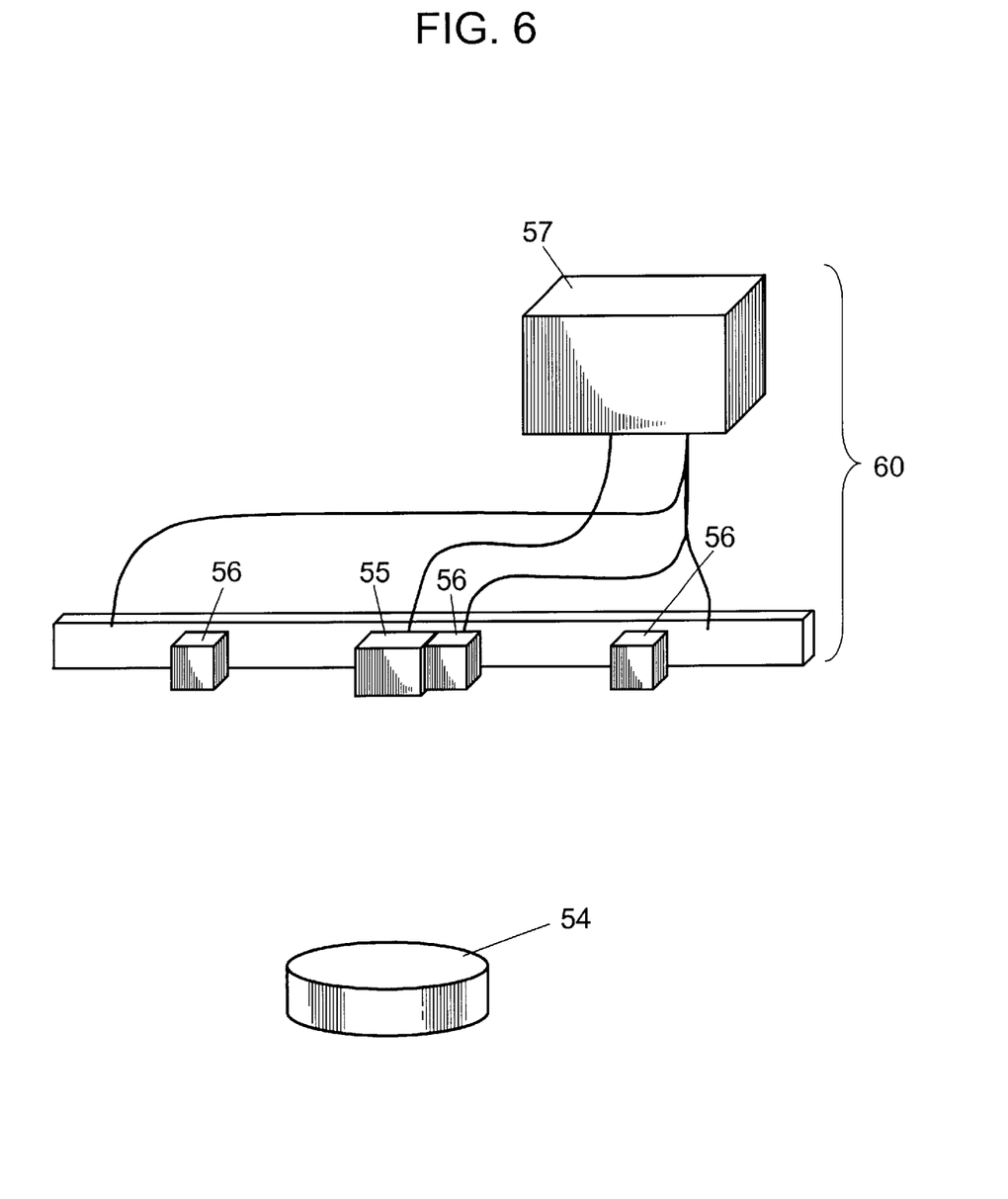
FIG. 6 shows concept of a conventional radio wave marker system.

FIG. 6 shows a conventional radio wave marker system. In FIG. 6, a reflection multiplier radio wave marker (hereinafter referred to as marker) 54 is installed in the surface of a road, while a marker sensor 60, which is formed of a transmit antenna 55, a receive antenna 56 and a detection•processing portion 57, is mounted on board a vehicle.

The transmit antenna 55 transmits electric wave to a marker 54, the electric wave reflected by the marker 54 is received by the receive antenna 56. The detection•processing portion 57 processes the signal received to calculate location of the vehicle in relation to the marker 54.

Referring to FIG. 6, one unit of transmit antenna 55 is disposed substantially in the middle; while the receive antenna 56 is disposed for three units, in the left, in substantially the middle and in the right.

Intensity of the electric wave reflected by a marker 54 is higher when the marker 54 is located closer to the transmit antenna 55 of marker sensor 60. Receiving sensitivity at a receive antenna 56 of marker sensor 60 goes higher when it is located closer to marker 54.

When distance between a marker 54 and a transmit antenna 55, or a receive antenna 56, of marker sensor 60 exceeds beyond a certain range, the marker sensor 60 becomes unable to detect the marker 54.

Being dependent on the shape and size of a transmit antenna 55 mounted at the front of a vehicle, it is difficult for a conventional radio wave marker system to detect location of a vehicle in relation to a marker 54 in the direction of width covering the entire range of a vehicle width. Namely, if a single transmit antenna 55 is to cover the entire range of a vehicle width evenly, it should be a loop antenna whose size is identical substantially to the vehicle width. In practice, such a loop antenna poses a great restriction in mounting it on board a vehicle.

In order to enable a vehicle to detect the location in relation to a marker in substantially the entire range of the vehicle width using a means mounted at the vehicle front, the transmit antenna 55 needs to be made compact in size and high in sensitivity. These are not easy tasks to achieve.

SUMMARY OF THE INVENTION

A reflection multiplier radio wave marker system which comprises a plurality of transmit antennas mounted on board a vehicle for transmitting electric wave signals in a first frequency; a reflection multiplier radio wave marker installed in the surface of a road, which reflects and transmits the electric wave signal of first frequency after multiplying it into an electric wave of a second frequency; and a receive antenna mounted on board the vehicle for receiving the electric wave of second frequency. The system detects location of the vehicle in a traffic lane based on the second frequency electric wave signal reached from a marker. Range of the location detection is extending to cover substantially the entire width of the vehicle.

DESCRIPTION OF THE PREFERRED EMBODIMENTS

Now in the following, preferred embodiments of the present invention are described with reference to FIG. 1 through FIG. 5.

(Embodiment 1)

Figure 1:
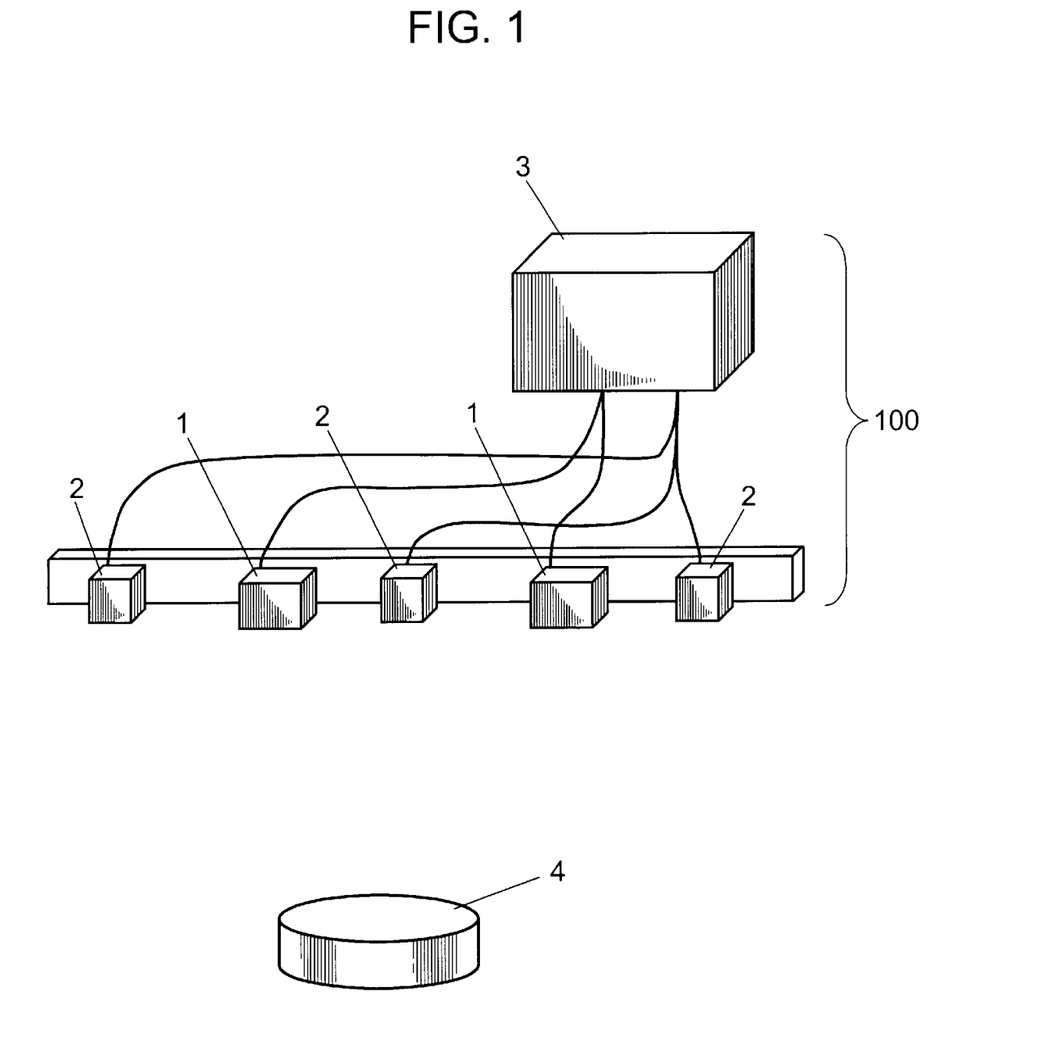
FIG. 1 shows overall concept of a radio wave marker system in accordance with a first exemplary embodiment of the present invention.

FIG. 1 shows concept of a radio wave marker system in accordance with a first exemplary embodiment of the present embodiment.

In FIG. 1, a marker sensor 100 comprises two units of a transmit antenna 1 for transmitting the synchronized electric wave signals of a first frequency, three units of a receive antenna 2 for receiving electric wave signals reflected/transmitted in a second frequency from a radio wave marker 4, and a detection-processing section 3 which performs functions of generating the transmit signal to be delivered to the transmit antenna 1 and detecting a reflection multiplier radio wave marker (hereinafter referred to as marker) 4 at the receive antenna 2 for calculating the relative location of the vehicle.

The transmit antennas 1 and the receive antennas 2 are aligned alternately on a substantially straight line. The marker 4 receives electric wave of first frequency transmitted from the marker sensor 100, and reflects and transmits it after multiplying two-fold in the frequency.

In the marker system of the present invention, a plurality of compact transmit antennas 1 disposed on a straight line and driven in the same phase provides an effect that is identical or higher than a single-unit loop antenna which transmits electric wave for the width direction of a vehicle at a high intensity level. As a result, a marker 4 can reflect and transmit the electric wave in a broader area, and the receive antennas 2 disposed at a substantially even layout on a vehicle can specify the location of marker 4 throughout substantially the entire width range of the vehicle.

Figure 2A:
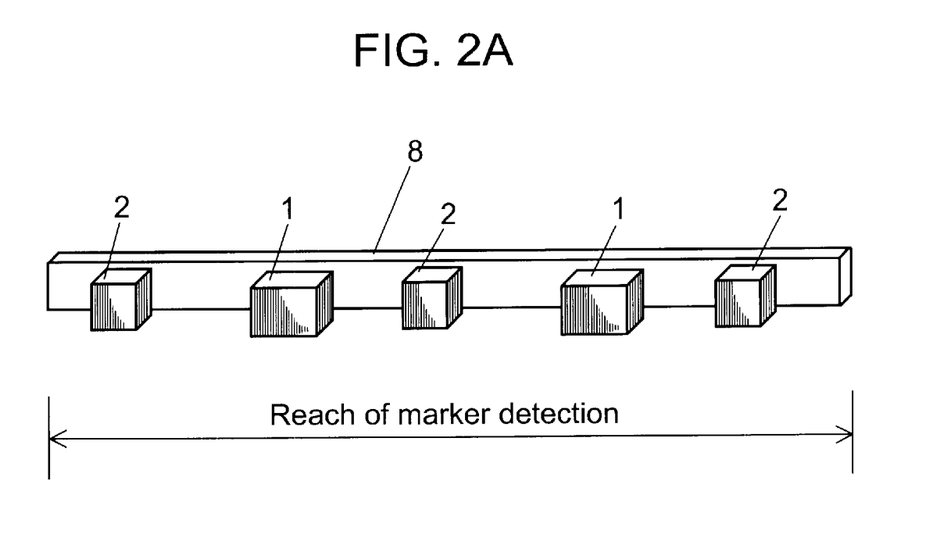
FIG. 2A shows structure of an antenna unit of the marker system.
Figure 2B:
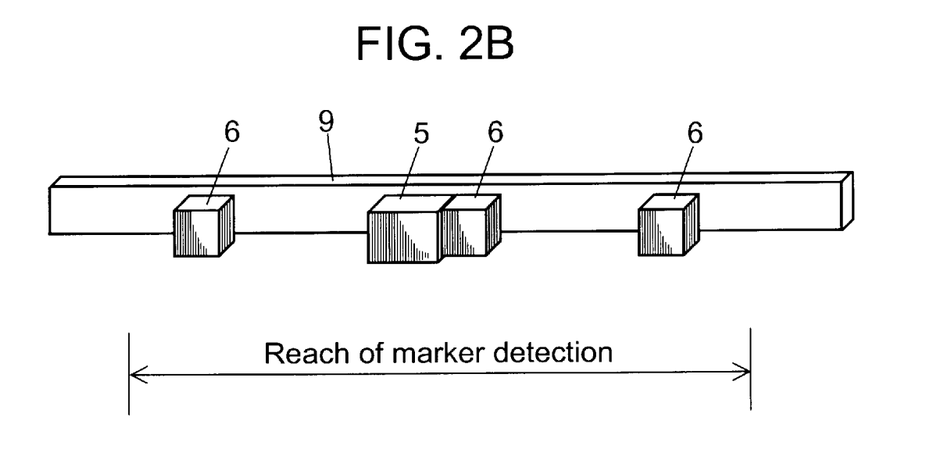
FIG. 2B shows the reach of marker detection with a conventional antenna unit.

FIG. 2A illustrates the reach of marker detection performed by an antenna unit 8 formed of the transmit antennas 1 and the receive antennas 2. FIG. 2B compares the performance by a conventional counterpart 9. As seen from FIG. 2A, an antenna disposition in accordance with the present invention has a wider reach of marker detection.

In the conventional disposition as shown in FIG. 2B, where a transmit antenna 5 and a central receive antenna 6 are placed close to each other as illustrated in FIG. 6, there exists a fear of possible trouble caused by the interference. In the antenna disposition of the present invention as shown in FIG. 2A, however, each of the respective transmit antennas 1 and receive antennas 2 is placed with a sufficient clearance secured from the adjacent unit, and the fear of interference has been alleviated.

As a consequence, the reach of detection has been expanded and a countermeasure against interference can be simplified. If the same detection range is to be covered with a conventional concept, a transmit antenna 1 having a much greater size is needed. The concept of combining compact transmit antennas 1 facilitates ease of mounting the antenna on a vehicle body.

(Embodiment 2)

Figure 3:
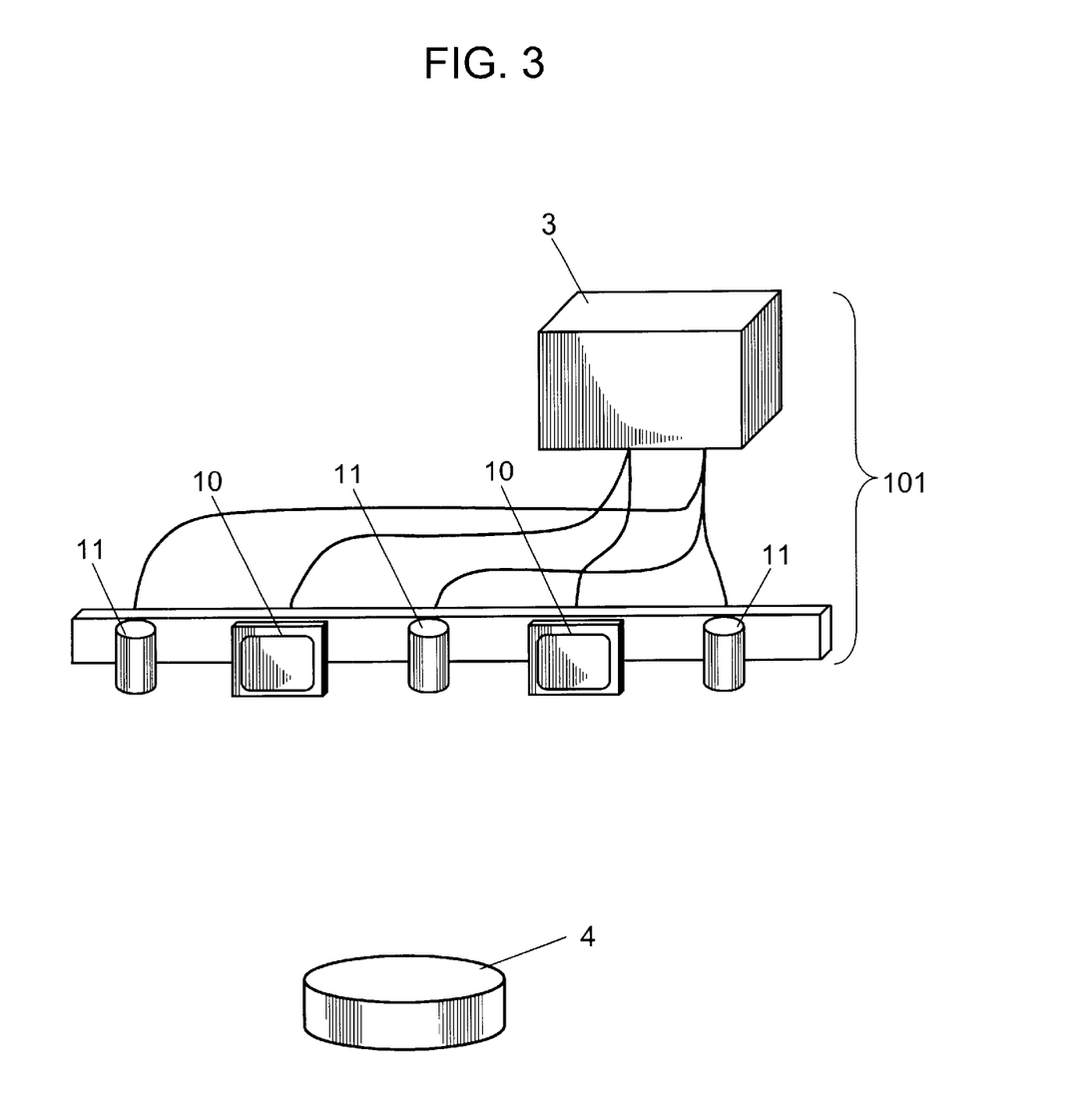
FIG. 3 shows overall concept of a radio wave marker system in accordance with a second exemplary embodiment.

FIG. 3 shows concept of a radio wave marker system in accordance with a second exemplary embodiment.

In a marker sensor 101, a transmit antenna 10 is loop antenna formed in a flat board shape maintaining the face area sufficiently large, which face area being relevant to output of the electric wave; the loop antenna is provided for two units operating in the same phase. A receive antenna 11 is formed in an approximate rod shape. When a receive antenna 11 is formed in an approximate rod shape with a ferrite or the like material, the receive antenna can be provided in a compact size without sacrificing the reception efficiency. The compact size of receive antenna contributes to an easier mounting on board a vehicle.

The transmit antenna 10 and the receive antenna 11 are aligned alternately on a substantially straight line which is perpendicular to the cruising direction, in a manner these antennas are standing vertical to the road surface.

(Embodiment 3)

Figure 4:
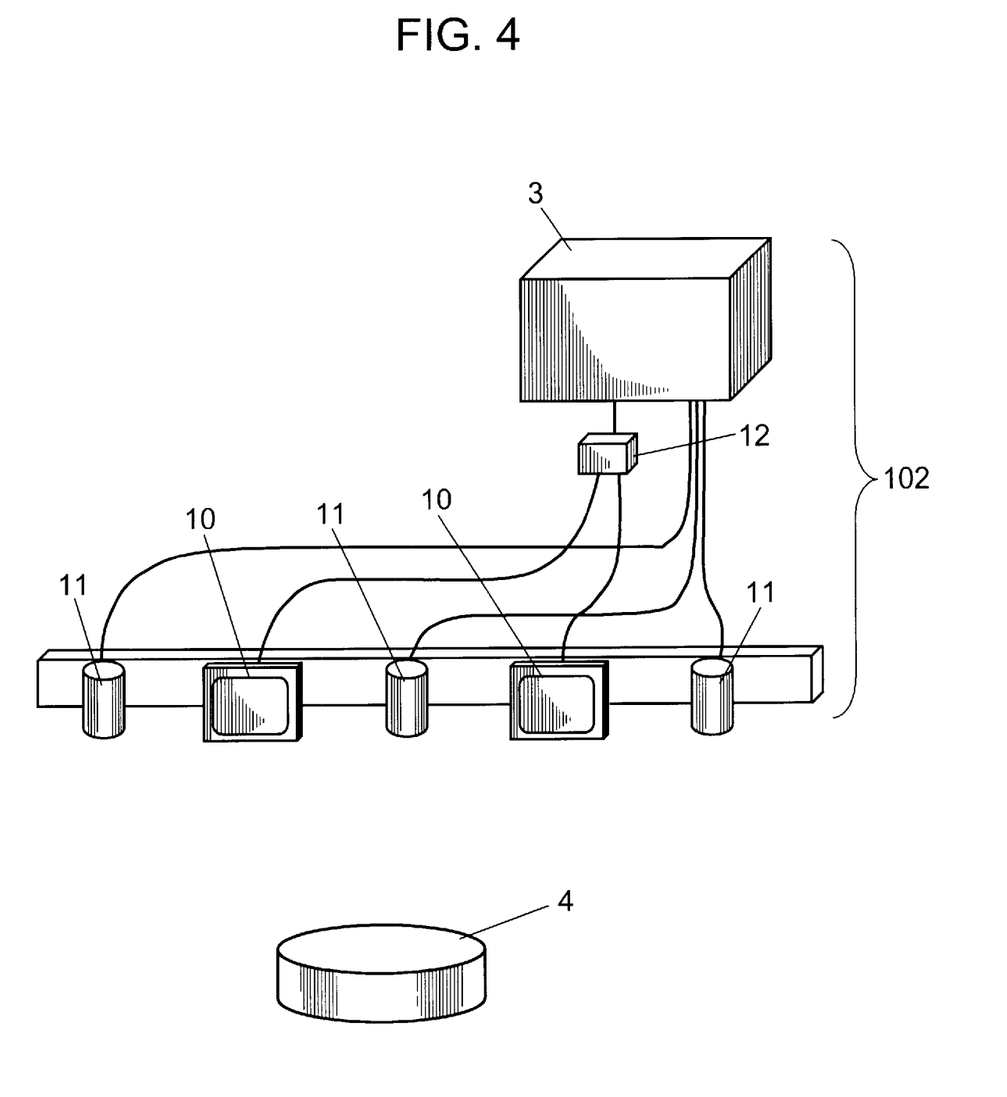
FIG. 4 shows overall concept of a radio wave marker system in accordance with a third exemplary embodiment.

FIG. 4 shows concept of a radio wave marker system in accordance with a third exemplary embodiment.

The embodiment 3 is identical to a system in embodiment 2 further provided with a power splitter 12. The two units of board-shape transmit antennas 10 are operated in the same phase. The power splitter 12 delivers signals to a plurality of transmit antennas 10 in the same phase at the same level. The receive antenna 11 and the detection•processing section 3 of marker sensor 102 remain the same as those in the embodiment 2.

The power splitter 12 facilitates splitting of the transmit antenna into a plurality of transmit antennas 10, and coupling them in parallel. This contributes to make a transmit antenna 10 compact in size, enables to specify location of a marker 4 throughout an approximate width of a vehicle, and improves the ease of mounting on board a vehicle.

(Embodiment 4)

Figure 5:
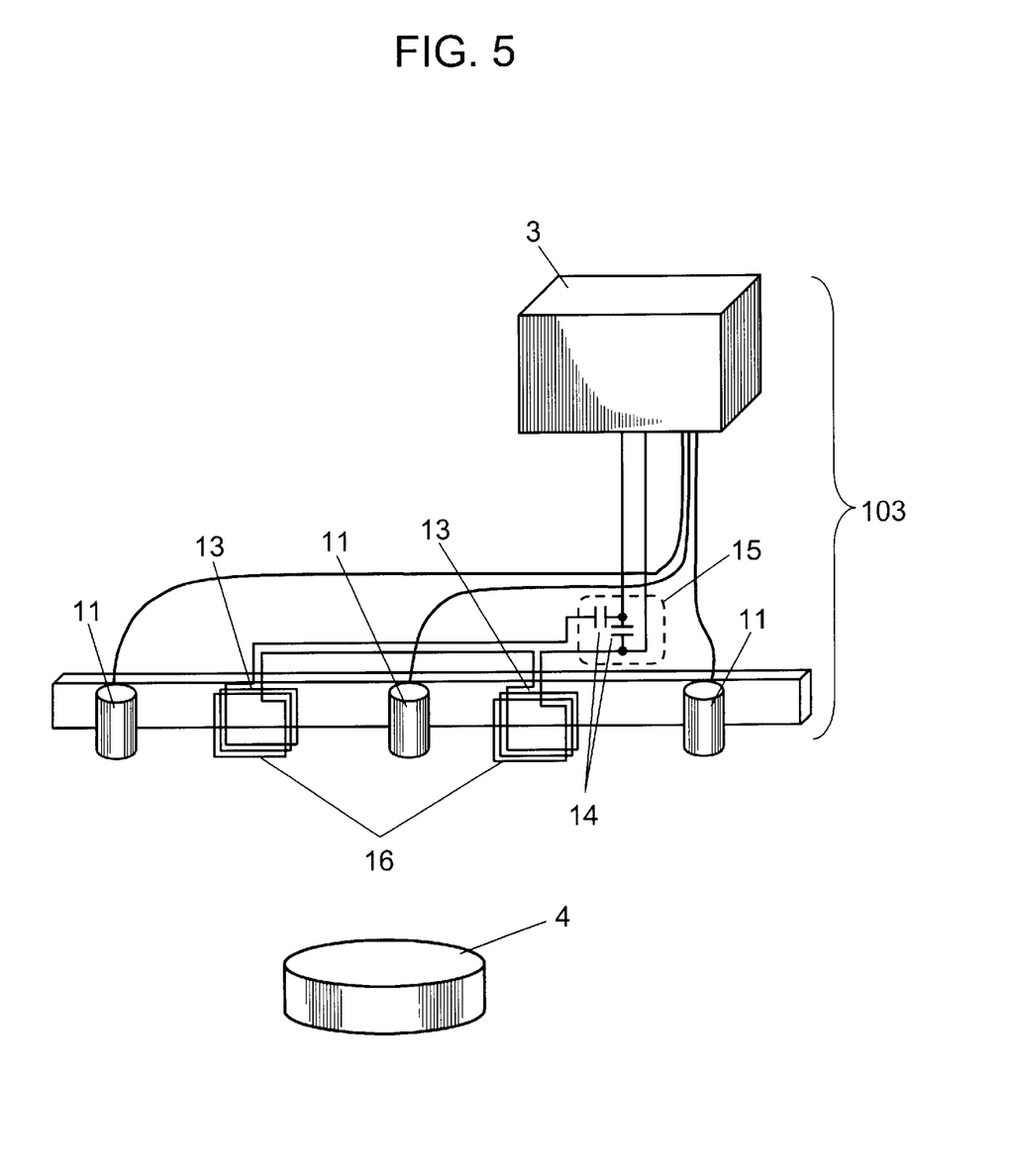
FIG. 5 shows overall concept of a radio wave marker system in accordance with a fourth exemplary embodiment.

FIG. 5 shows concept of a radio wave marker system in accordance with a fourth exemplary embodiment.

The embodiment 4 is identical to a system in embodiment 3 with the exception in the structure of transmit antenna 13 in the marker sensor 103. The transmit antenna 13 in the present embodiment 4 is formed of a plurality of transmit antenna coils wound in a unified direction and coupled in series.

A tuning circuit 15, which is formed of two capacitors 14 coupled in series, is connected in parallel to the transmit antenna 13; coupling point of the two capacitors 14 and one end of the transmit antenna 13 are led to the detection•processing section 3 by means of a pair of cables in a single phase.

Under the above-configured structure, the down-sized and split transmit antenna coils 13 function as an electrically-equivalent single-body transmit antenna 16. This enables to specify location of a marker 4 throughout an approximate width range of a vehicle, without having a space-demanding loop antenna. This also contributes the ease of mounting on board a vehicle.

(Embodiment 5)

A fifth exemplary embodiment of the present invention relates to a traffic system. In the traffic system of the present invention, a vehicle cruises with either one of the reflection multiplier radio wave marker systems of the embodiments 1 through 4 on board to keep detecting markers 4 installed in the surface of a road for specifying the location in the width direction throughout substantially the entire width range of the vehicle.

Thus in the system, amount of the sidewise deviation from the center of a lane is detected throughout substantially the entire width range of a vehicle with high accuracy, the detection results are notified to a driver or the vehicle. A vehicle receives an anti-lane deviation service based on the information thus provided.

As described in the above, a vehicle is provided with information on the vehicle location which is made available by the reflection multiplier radio wave marker system, and can avoid deviating from a traffic lane.

(Embodiment 6)

In a traffic system of a sixth exemplary embodiment of the present invention, a vehicle cruises with either one of the reflection multiplier radio wave marker systems of the embodiments 1 through 4 on board to keep detecting markers 4 installed in the surface of a road for specifying the location in the width direction throughout substantially the entire width range of the vehicle.

Amount of the sidewise deviation from the center of a lane is detected throughout substantially the entire width range of a vehicle with high accuracy. An automatic cruising can be implemented by controlling the steering and speeding so that the amount of deviation is kept within a certain specified range.

In the present embodiment, a vehicle may have the split and downsized transmit antennas on board and transmits electric waves in a same phase to make the signal level in terms of the vehicle width direction to be equal or higher than that transmitted from a bulky single-unit loop antenna. Furthermore, since the compact receive antennas can be disposed evenly on a line arrangement, the location of a radio wave marker can be specified throughout substantially the whole width range of a vehicle. Thus, a big loop antenna is not needed any more; mounting of the compact antennas is much easier and provides flexibility in the mounting.

Furthermore, the transmit antenna may be formed in an approximate board shape using, for example, a printed circuit board, and the receive antenna may be formed in a rod shape using a ferrite, for example. These facilitate a compact setup, yet it enables to specify the location of a marker throughout substantially the entire width range of a vehicle. It also improves the ease of mounting on board a vehicle.

Furthermore, a power splitter may be provided for transmitting electric waves in parallel from the split and down-sized antennas respectively with the same phase at the same level. This enables to specify the location of a marker throughout substantially the entire width range of a vehicle. It also improves the ease of mounting on board a vehicle.

Still further, in order to bring the split and downsized transmit antennas into an electrically-unified single transmit antenna by coupling these coils in series, a couple of capacitors may be provided for tuning. This enables to specify the location of a marker throughout substantially the entire width range of a vehicle. It also improves the ease of mounting on board a vehicle.

When a vehicle is provided with a reflection multiplier radio wave marker system on board and markers 4 are installed in the surface of a road, it becomes possible to specify the location in the width direction throughout substantially the width range of a vehicle and to control cruising direction of the vehicle. This leads to a traffic system, with which a vehicle is provided with a service to prevent a vehicle from making deviation from a traffic lane.

A more sophisticated automatic traffic system may be implemented, with which a vehicle can cruise by itself for a certain destination.

What is claimed is:

1. A reflection multiplier radio wave marker system, comprising:

a plurality of transmit antennas mounted on board a vehicle for transmitting electric wave signals of first frequency;

a reflection multiplier radio wave marker installed in the surface of road for receiving said electric wave signal of first frequency and transmitting it after multiplying into a second frequency; and a plurality of receive antennas mounted on board said vehicle for receiving said electric wave signal of second frequency, wherein said plurality of transmit antennas and said plurality of receive antennas disposed alternately from each other along a substantially straight line in substantially an entire width range of said vehicle, said vehicle can detect location of said reflection multiplier radio wave marker by receiving said electric wave signal of second frequency throughout substantially the entire width range of vehicle for specifying the transversal location of vehicle in a traffic lane.

2. The reflection multiplier radio wave marker system of claim 1, wherein each of said transmit antennas for transmitting electric wave signal of first frequency is formed in an approximate board shape, each of said receive antennas for receiving electric wave of second frequency is formed in an approximate rod shape, and said transmit antennas and said receive antennas are disposed alternately on a substantially straight line which is approximately transversal to cruising direction of said vehicle.

3. The reflection multiplier radio wave marker system of claim 1, wherein said plurality of transmit antennas for transmitting electric wave of first frequency are coupled in parallel, and further provided with a power splitter for transmitting the signals with identical phase at identical level.

4. The reflection multiplier radio wave marker system of claim 1, wherein said plurality of transmit antennas for transmitting electric wave of first frequency comprises respectively a plurality of transmit antenna coils coupled in series, a plurality of capacitors are coupled for tuning, and said plurality of tuning capacitors are connected to a single phase transmit cable.

5. The reflection multiplier radio wave marker system of claim 2, wherein said plurality of transmit antennas for transmitting electric wave of first frequency are coupled in parallel, and further provided with a power splitter for transmitting the signals with identical phase at identical level.

6. The reflection multiplier radio wave marker system of claim 2, wherein said plurality of transmit antennas for transmitting electric wave of first frequency comprises respectively a plurality of transmit antenna coils coupled in series, a plurality of capacitors are coupled for tuning, and said plurality of said tuning capacitors are connected to a single phase transmit cable.

7. The reflection multiplier radio wave marker system of claim 1, wherein said plurality of transmit antennas and said plurality of receive antennas disposed alternately with interval from each other along a substantially straight line in substantially an entire width range of vehicle.

8. A reflection multiplier radio wave marker system according to claim 1, wherein each of said transmit antennas are spaced apart from adjacent ones of said receive antennas.

9. A traffic system comprising a reflection multiplier radio wave marker system, which comprises:

a plurality of transmit antennas mounted on board a vehicle for transmitting electric wave signals of first frequency;

a reflection multiplier radio wave marker installed in the surface of road for receiving said electric wave signal of first frequency and transmitting it after multiplying into second frequency; and a plurality of receive antennas mounted on board said vehicle for receiving said electric signal of second frequency, wherein said plurality of transmit antennas and said plurality of receive antennas disposed alternately from each other along a substantially straight line in substantially an entire width range of vehicle, said vehicle can detect location of said reflection multiplier radio wave marker by receiving said electric wave signal of second frequency throughout substantially the entire width range of vehicle for specifying the transversal location of vehicle in a traffic lane.

10. The traffic system of claim 9 comprising a reflection multiplier radio wave marker system, wherein each of said transmit antennas for transmitting electric wave signal of first frequency is formed in a substantially board shape, each of said receive antennas for receiving electric wave of second frequency is formed in a substantially rod shape, and said transmit antennas and said receive antennas are disposed alternately on a substantially straight line which is approximately transversal to cruising direction of said vehicle.

11. The traffic system of claim 9 comprising a reflection multiplier radio wave marker system, wherein said plurality of transmit antennas for transmitting signals of first frequency are coupled in parallel, and further provided with a power splitter for transmitting the signals with identical phase at identical level.

12. The traffic system of claim 9 comprising a reflection multiplier radio wave marker system, wherein said plurality of transmit antennas for transmitting electric wave of first frequency comprises respectively a plurality of transmit antenna coils coupled in series, a plurality of capacitors are coupled for tuning, and said plurality of tuning capacitors are connected to a single phase transmit cable.

13. The traffic system recited in claim 9, wherein
said vehicle prevents it from making deviation out of a traffic lane based on information about location of said vehicle made available by said reflection multiplier radio wave marker system.

14. The traffic system recited in claim 9, wherein
said vehicle cruises automatically based on information about location of said vehicle made available by said reflection multiplier radio wave marker system.

15. The traffic system recited in claim 10, wherein
said vehicle prevents it from making deviation out of a traffic lane based on information about location of said vehicle made available by said reflection multiplier radio wave marker system.

16. The traffic system recited in claim 11, wherein said vehicle prevents it from making deviation out of a traffic lane based on information about location of said vehicle made available by said reflection multiplier radio wave marker system.

17. The traffic system recited in claim 12,wherein
said vehicle prevent it from making deviation out of a traffic lane based on information about location of said vehicle made available by said reflection multiplier radio wave marker system.

18. The traffic system recited in claim 10, wherein
said vehicle cruises automatically based on information about location of said vehicle made available by said reflection multiplier radio wave marker system.

19. The traffic system recited in claim 11, wherein
said vehicle cruises automatically based on information about location of said vehicle made available by said reflection multiplier radio wave marker system.

20. The traffic system recited in claim 12, wherein
said vehicle cruises automatically based on information about location of said vehicle made available by said reflection multiplier radio wave marker system.

21. The traffic system of claim 9 comprising a reflection multiplier radio wave marker system, wherein
said plurality of transmit antennas and said plurality of receive antennas disposed alternately with an interval from each other along a substantially straight line in substantially an entire width range of vehicle.

22. A traffic system comprising a reflection multiplier radio wave marker system according to claim 9, wherein each of said transmit antennas are spaced apart from adjacent ones of said receive antennas.

\* \* \* \* \*